United States Patent
Heink

(10) Patent No.: US 9,170,970 B2
(45) Date of Patent: Oct. 27, 2015

(54) DETECTOR TO SEARCH FOR CONTROL DATA

(75) Inventor: Matthias Heink, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 1134 days.

(21) Appl. No.: 11/623,278

(22) Filed: Jan. 15, 2007

(65) Prior Publication Data
US 2008/0172533 A1    Jul. 17, 2008

(51) Int. Cl.
G06F 13/00 (2006.01)
G06F 13/38 (2006.01)

(52) U.S. Cl.
CPC .................................. G06F 13/387 (2013.01)

(58) Field of Classification Search
USPC ............................ 709/230–237; 710/105–106
See application file for complete search history.

(56) References Cited

U.S. PATENT DOCUMENTS

| | | |
|---|---|---|
| 6,233,224 B1 | 5/2001 | Yamashita et al. |
| 6,690,648 B2 | 2/2004 | Niida et al. |
| 6,798,751 B1 | 9/2004 | Voit et al. |
| 6,829,250 B2 | 12/2004 | Voit et al. |
| 6,850,531 B1 | 2/2005 | Rao et al. |
| 7,002,965 B1 * | 2/2006 | Cheriton .................. 370/395.32 |
| 7,117,300 B1 * | 10/2006 | James et al. .................. 711/108 |
| 2003/0053474 A1 * | 3/2003 | Tuck et al. .................... 370/422 |

* cited by examiner

Primary Examiner — Ranodhi Serrao

(57) ABSTRACT

Implementations related to detecting control data are presented herein. A detector searches for control data in a first set of pre-determined control data, wherein a respective subset of the first set is assigned to a respective logical port and the respective subset is excluded from the first set when searching for the control data received from the respective logical port.

29 Claims, 3 Drawing Sheets

| | transparency indication (binary) | MAC Destination Add (hex) | Ethertype (hex) | IP protocol (hex) | UDP Port (hex) | control data | name | action |
|---|---|---|---|---|---|---|---|---|
| LP1 control data E, F, J / transparent bits-011100 | xxxxx0 | XXXXXXXXXXX | 0806 | XX | XXXX | ARP | E | fwd SW |
| | xxxx0x | XXXXXXXXXXX | 0888E | XX | XXXX | EAPOL | F | fwd SW |
| LP2 control data E, F, G, H, J / transparent bits-010000 | xxx0xx | XXXXXXXXXXX | 0800 | 01 | XXXX | ICMP | G | discard |
| | xx0xxx | XXXXXXXXXXX | 0800 | 02 | XXXX | IGMP | H | fwd SW |
| LP3 control data I, J, K / transparent bits-101111 | x0xxxx | XXXXXXXXXXX | 0800 | 11 | 0043 | DHCP server | I | fwd SW |
| | x0xxxx | XXXXXXXXXXX | 0800 | 11 | 0044 | DHCP host | I | discard |
| | 0xxxxx | 0180C2000000 | XXXX | XX | XXXX | MAC Control | J | discard |
| | xxxxxx | 0180C2000000 | XXXX | XX | XXXX | MAC Control | J | fwd SW |
| | x0xxxx | 10ABCD | XXXX | XX | XXXX | | K | discard | dedicated MAC Destination Address

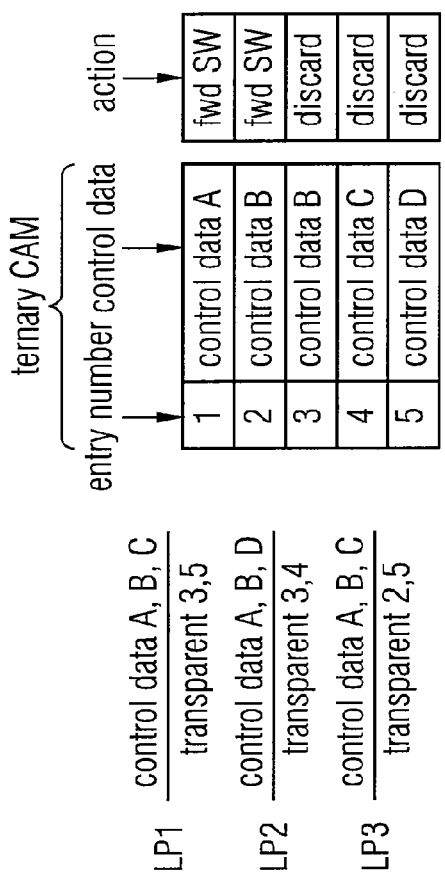
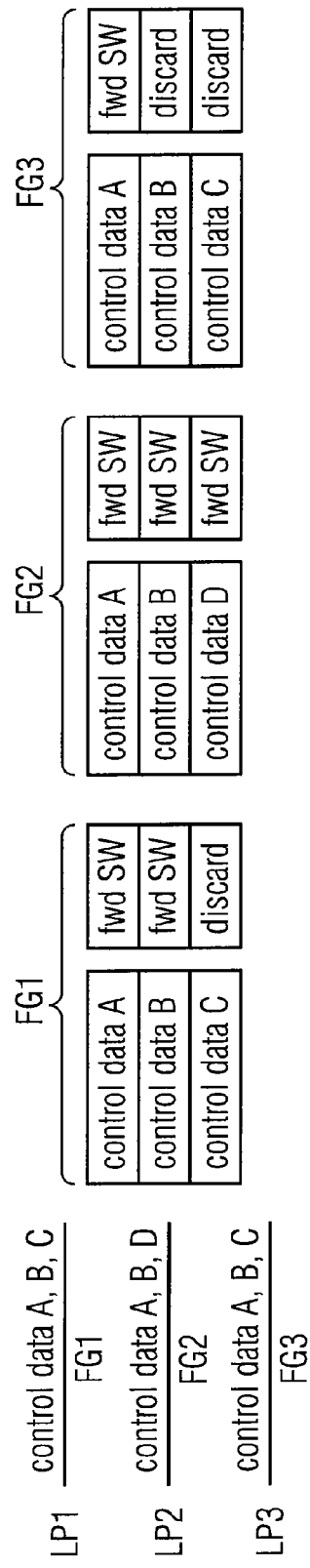
FIG 3
FIG 4

FIG 5

| transparency indication (binary) | MAC Destination Add (hex) | Ethertype (hex) | IP protocol (hex) | UDP Port (hex) | control data | name | action |
|---|---|---|---|---|---|---|---|
| xxxxx0 | XXXXXXXXXXXX | 0806 | XX | XXXX | ARP | E | fwd SW |
| xxxx0x | XXXXXXXXXXXX | 0888E | XX | XXXX | EAPOL | F | fwd SW |
| xxx0xx | XXXXXXXXXXXX | 0800 | 01 | XXXX | ICMP | G | discard |
| xx0xxx | XXXXXXXXXXXX | 0800 | 02 | XXXX | IGMP | H | fwd SW |
| x0xxxx | XXXXXXXXXXXX | 0800 | 11 | 0043 | DHCP server | I | fwd SW |
| x0xxxx | XXXXXXXXXXXX | 0800 | 11 | 0044 | DHCP host | I | discard |
| 0xxxxx | 0180C2000000 | XXXX | XX | XXXX | MAC Control | J | discard |
| xxxxxx | 0180C2000000 | XXXX | XX | XXXX | MAC Control | J | fwd SW |
| x0xxxx | 10ABCD | XXXX | XX | XXXX | | K | discard | ternary CAM / memory dedicated MAC Destination Address

LP1 control data E, F, J / transparent bits-011100
LP2 control data E, F, G, H, J / transparent bits-010000
LP3 control data I, J, K / transparent bits-101111

DETECTOR TO SEARCH FOR CONTROL DATA

BACKGROUND OF THE INVENTION

This invention relates to a detector to search for control data.

Communication between two or more stations may be based on communication protocols. Data that are exchanged between the stations may comprise user data (payload data) and control data. The user data comprise information which a user wants to transport. The control data comprise information which controls the communication of the user data. If user data and control data are interleaved, an end station or an intermediate station may need to be able to detect the control data in the received data and perform possible actions based on the information contained in the control data.

BRIEF DESCRIPTION OF THE DRAWINGS

FIG. 3 schematically illustrates a detection scheme to search for control data according to a further exemplary embodiment of the invention.

FIG. 4 schematically illustrates a further detection scheme to search for control data.

FIG. 5 schematically illustrates a further detection scheme to search for control data according to a further exemplary embodiment of the invention.

DETAILED DESCRIPTION OF THE INVENTION

Figure 1:
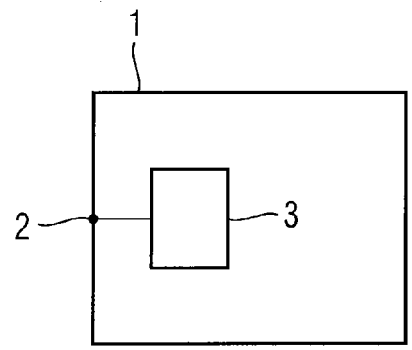
FIG. 1 schematically illustrates a device according to an exemplary embodiment of the invention.

In the following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, a schematic diagram of a device 1 is shown, which serves as an exemplary embodiment of the invention. The device 1 comprises one or more input terminals 2 and a detector 3. At the input terminal 2 data are received from a plurality of logical ports, which are, for example, users of a communication system. The data received at the input terminal 2 contain user data and control data. The detector 3 receives the incoming data from the input terminal 2 and searches for the control data, which are comprised in the incoming data, in a first set of pre-determined control data. Thereby a respective subset of the first set is assigned to a respective one of the logical ports. When searching for the control data received from a respective logical port, the respective subset is omitted from the search. The first set of the pre-determined control data may be stored in a memory.

Figure 2:
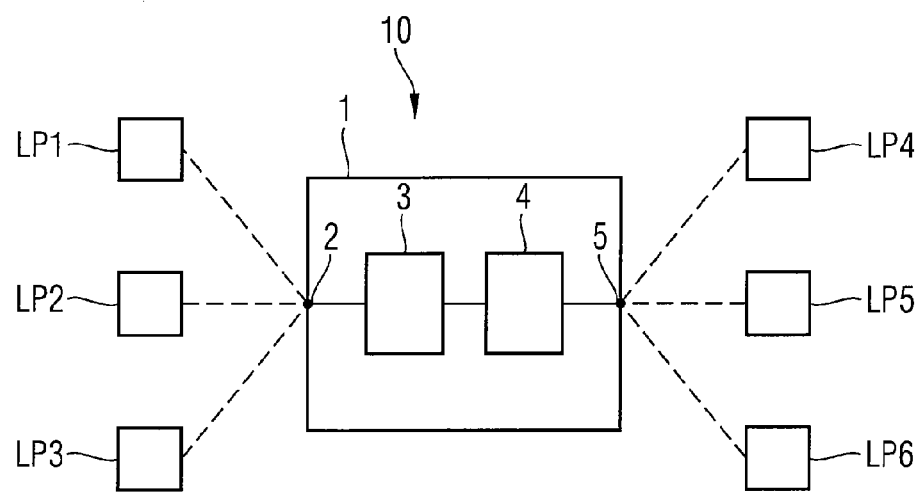
FIG. 2 schematically illustrates a communication system according to a further exemplary embodiment of the invention.

The device 1 may, for example, be part of a communication system 10, which is schematically illustrated in FIG. 2. At the input terminal 2 data may be received from logical ports LP1, LP2 and LP3. Alternatively, the device 1 may comprise three input terminals, which are assigned to the logical ports LP1, LP2 and LP3, respectively. The detector 3 uses the incoming control data to search for them in the first set of pre-determined control data. Moreover, the received data may be further processed in a processing unit 4. The device 1 may comprise one or more output terminals 5 to transmit data to logical ports LP4, LP5 and LP6. The data may be conveyed to or from the device 1 in a wired or wireless manner. The data exchanged between the device 1 and the logical ports LP1 to LP6 may be arranged in data packets and/or frames.

The detector 3 may comprise one or more filters which compare the data received at the input terminal 2 with the pre-determined control data. The detector 3 may only compare dedicated fields in the data packets or frames with the pre-determined control data. If a control data is detected, it can be handled different from the user data, for example it can be forwarded to a software process (action: fwd SW) or can be discarded (action: discard). The control data may contain information on how to process the user data.

For detecting the control data, a content-addressable memory (CAM), in particular a ternary CAM, may be implemented in the detector 3. A CAM is a special type of a memory which can, for example, be used in high speed searching applications. CAMs are also known in the literature as associative memories, associative storages or associative arrays. Unlike standard memories, such as RAMs (Random Access Memory), in which a memory address is provided and the memory returns the data word stored at that address, a CAM is designed such that a data word is provided and the CAM searches its memory to check if that data word is stored anywhere in it. A ternary CAM is a CAM that uses data search words comprised of 0, 1 and x. The matching state x, which is also called "don't care," is a wildcard for one or more bits. This third matching state adds more flexibility to the search. For example, a ternary CAM may have a stored word of "10xx0," which will match any of the four search words "10000," "10010," "10100" and "10110."

FIG. 3 schematically illustrates how the pre-determined control data are entered in a ternary CAM according to an exemplary embodiment of the invention. In this embodiment the first set of pre-determined control data comprises control data A, B, C and D. The control data A, B, C and D are entered in the ternary CAM together with a corresponding entry number and the appropriate action as shown in the diagram on the right hand side of FIG. 3. Furthermore, transparency information is assigned to each of the logical ports LP1 to LP3, which transmit data to the device 1. If a logical port does not use certain control data with the assigned action as shown in the diagram on the right hand side of FIG. 3, this entry in the ternary CAM can be marked as transparent for the respective logical port. When the detector 3 searches for the control data in the ternary CAM, it will not detect the entries marked as transparent for that specific logical port. In other words, a respective subset of the first set of the pre-determined control data A, B, C and D is assigned to each of the logical ports LP1, LP2 and LP3. The respective subset is omitted from the search for the control data when the detector 3 searches for control data received from the respective logical port.

If for the same control data different actions are used depending on the logical port the incoming data are received from, one entry for each action can be entered in the ternary CAM. For example, when the received data stream contains the control data B and the control data B is detected in the ternary CAM, the control data B might be either forwarded to the software (entry number 2) or might be discarded (entry number 3). For each of the logical ports LP1 to LP3 the respective entry numbers with the not desired action are marked as transparent.

Referring to the exemplary embodiment of the invention shown in FIG. 3, the entry numbers 3 and 5 are marked as transparent for the logical ports LP1. Thus, the detector 3 can only detect the entry numbers 1, 2 and 4 in the ternary CAM. If the data received from the logical port LP1 contain the control data A and B, these control data will be detected in the ternary CAM and will be forwarded to the software, whereas control data C are discarded when detected.

For the logical port LP2, the entry numbers 3 and 4 are transparent so that the detector 3 can only detect the control data A, B and D according to the entry numbers 1, 2 and 5 in the ternary CAM. If control data A and B are detected, the control data A and B are forwarded to the software, whereas control data D are discarded upon detection.

For the logical port LP3, the entry numbers 2 and 5 are marked as transparent. Thus, the detector 3 can only detect the entry numbers 1, 3 and 4 in the ternary CAM. If the control data A is detected, the control data A is forwarded to the software, whereas control data B and C are discarded when detected.

As can be seen from FIG. 3, each type of control data to be detected is one entry in the ternary CAM. The type of the control data which has to be detected depends on the communication protocol used, and multiple types of control data may be in use for one communication protocol. Different users may use different communication protocols and may therefore send different control data. For example, the protocol PPPoE (Point-to-Point Protocol over Ethernet) uses the control data PADI (PPPoE Active Discovery Initiation), PADO (PPPoE Active Discovery Offer), PADR (PPPoE Active Discovery Request) and PADS (PPPoE Active Discovery Session-confirmation) to configure the PPPoE data communication and the communication protocol Ethernet sends flow control data to control the data rate. It may also be provided that for certain users, which use the same communication protocol, an end station or intermediate station acts on the control data in a certain way, whereas for other users the same control data are not used by the end station or intermediate station and is therefore transparent or it requires a different action. For example, an Ethernet flow control frame can be either discarded or forwarded to the software or forwarded transparently without any action. This behavior may be different for each logical port.

According to a further embodiment, it is possible to have one separated ternary CAM for each communication protocol. Since each communication protocol typically uses a specific set of control data, for example the protocol PPPoE uses PADI, PADO, PADR and other control data and the IP protocol suite uses ARP, RARP, ICMP, IGMP and other control data, a separated ternary CAM for each communication protocol limits the number of entries in each of the ternary CAMs. It may be provided that logical ports using the same communication protocol access the same ternary CAM, whereas logical ports using another communication protocol access a different ternary CAM.

Control data which have been filtered by the detector 3 and have been forwarded to the software might be reinserted by the software into the data path after the software has finished processing. The logical port of the software can be set in such a way that all control data are transparent. Otherwise the control data would be filtered again and send back to the software, thus creating an undesired loop.

The assignment of the transparency indication to the control data is flexible. Multiple control data entries may be assigned to one transparency indication if the behavior is the same.

In order to demonstrate further advantages of the detection scheme shown in FIG. 3, an alternative detection scheme is illustrated in FIG. 4. In the detecting scheme shown in FIG. 4, the logical ports LP1, LP2 and LP3 are assigned to filter groups FG1, FG2 and FG3, respectively. Each of the filter groups FG1 to FG3 contains the control data to be detected and determines the appropriate action which has to be performed upon detection of the respective control data. The detection might be carried out using a ternary CAM. If one user must not act on certain control data but another user must act on that specific control data, two different filter groups must be established and assigned. For example, the logical port LP1 uses the control data A, B and C, and the logical port LP3 uses the control data A, B and D. Therefore, the filter group FG1 with the control data A, B and C is established for the logical port LP1, whereas the filter group FG2 with the control data A, B and D is established for the logical port LP2.

In the example of FIG. 4, a new filter group is also needed if the action for the same control data is different for at least two users. For example, for the logical port LP3 a filter group FG3 must be established because the behavior for the control data B is different from the behavior of the filter group FG1.

The results of the two different detection schemes shown in FIGS. 3 and 4 are the same. However, an advantage of the detection scheme shown in FIG. 3 is that only one group of control data needs to be defined, whereas several filter groups must be established when using the scheme according to FIG. 4. The handling of the control data can be configured for each logical port in the detection scheme according to FIG. 3. This saves entries in the filtering database, which might be a ternary CAM.

Referring to FIG. 5, a further exemplary embodiment of the invention is schematically illustrated. In this exemplary embodiment control data ARP (Address Resolution Protocol), EAPOL (Extensible Authentication Protocol over LAN), ICMP (Internet Control Message Protocol), IGMP (Internet Group Management Protocol), DHCP (Dynamic Host Configuration Protocol) server, DHCP (Dynamic Host Configuration Protocol) host and MAC (Media Access Control) control are associated with control data E, F, G, H, I, J and K. The control data E, F, G, H, I, J and K form a first set of control data which are entered in a ternary CAM as shown in the diagram of FIG. 5. Furthermore, information on transparency indications, MAC destination addresses, Ethertype, IP protocol and UDP (User Datagram Protocol) port are entered in the ternary CAM. The actions associated with the respective entries of the ternary CAM are entered in a further memory. The bit x stands for a "don't care" bit and the nibble X stands for a "don't care" nibble (X=xxxx). Transparent bits are assigned to each of the logical ports LP1 to LP3.

When data are received at the input terminal 2 from one of the logical ports LP1 to LP3, the respective transparent bits assigned to the respective logical ports are appended to the search pattern for the ternary CAM. The pattern stored in the ternary CAM is extended by the transparency indication for each entry. The ternary CAM compares the search pattern including the respective transparent bits assigned to the respective logical port with all patterns stored in the ternary CAM. If the search pattern matches one of the stored patterns, the control data is detected and the name of the control data is used as an address for accessing the memory in which the actions are stored. Afterwards, the action associated with the detected control data can be performed.

One or no bit of each transparency indication in the ternary CAM is set to 0, all other bits of the respective transparency indication are set to x and are thus wildcarded. If a control data should be transparent for a logical port, the transparent bit assigned to that logical port is set to 1 for the corresponding control data entry in the ternary CAM, the other transparent bits of that logical port are set to 0. Since the ternary CAM compares the search pattern with all the patterns stored in the ternary CAM, a match can only occur if the pattern matches and the not wildcarded transparency indications are identical to the transparent bits, which means that they are 0. A transparent bit of a logical port which is 1 cannot result in a match with a not wildcarded transparency indication, since the corresponding transparency indication is 0.

Referring to the exemplary embodiment of the invention shown in FIG. 5, the transparent bits 011100 are assigned to the logical port LP1. Thus, the detector 3 can only detect the control data E, F and J. In case the control data E and F are detected, the control data E and F are forwarded to the software, whereas control data J is discarded upon detection. For the entry of the control data J the first entry in the ternary CAM is used (transparency indication: 0xxxxx), unless the first entry is transparent for the respective logical port. In this case the second entry of the control data J is used (transparency indication: xxxxxx) and the control data J is forwarded to the software.

For the logical port LP2, the transparent bits 010000 are used. Thus, the detector 3 can only detect the control data E, F, G, H and J. In case the control data E, F and H are detected, the control data E, F and H are forwarded to the software. The control data G and J are discarded when detected.

The transparent bits 101111 are assigned to the logical port LP3. Thus, the detector 3 searches the ternary CAM only for the control data I and J. If the control data I is detected, the control data I is forwarded to the software or discarded depending on the UDP port. The control data J is forwarded to the software when detected. The control data K is discarded upon detection. The control data K is associated with a dedicated MAC destination address, which may be, for example, a printer address or any other address of a device or software. Control data K thus allows to specify users which have the permission to access the device or software associated with the dedicated MAC destination address.

In order to assign the transparent bits to the data received from the logical ports LP1 to LP3, the transparent bits may be either stored in the device 1 or may be contained in the data packets or frames received from the logical ports LP1 to LP3.

The communication system 10 may be a DSL (Digital Subscriber Line) communication system.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include," "have," "with," or other variants thereof are used in either the detailed description or the claims, such terms are intended to be inclusive in a manner similar to the term "comprise." The terms "coupled" and "connected," along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A device, comprising:
   at least one input terminal to receive data comprising control data from a plurality of logical ports; and
   a detector, coupled to the at least one input terminal, configured to search for the control data in a first set of pre-determined control data, wherein a respective subset of the first set is assigned to a respective one of the logical ports and the respective subset is excluded from the first set when searching for the control data received from the respective logical port, wherein the respective subset is defined by a respective transparency indication comprising one or more bit combinations to be excluded.

2. The device of claim 1, wherein the first set of the pre-determined control data is stored in a ternary content-addressable memory.

3. The device of claim 1, wherein the respective transparency indication is assigned to each of the pre-determined control data.

4. The device of claim 1, wherein the respective transparency information is assigned to each of the logical ports.

5. The device of claim 1, wherein, a respective transparency indication is assigned to each of the pre-determined control data and a respective transparency information is assigned to each of the logical ports, and wherein when searching for control data received from a respective one of the logical ports, a respective one of the pre-determined control data is omitted from the search for the control data when the transparency indication of the respective pre-determined control data matches the transparency information of the respective logical port.

6. The device of claim 1, wherein the data received from at least two different logical ports uses different protocols having different control data.

7. The device of claim 1, wherein the first set of pre-determined control data is associated with one or more communication protocols.

8. The device of claim 1, wherein a respective one of the control data is assigned to a respective action that is to be performed when the respective control data is detected.

9. The device of claim 1, wherein a first subset of the first set of pre-determined control data is assigned to a first one of the plurality of logical ports and a second subset of the first set of pre-determined control data is assigned to a second one of the plurality of logical ports, and wherein at least one element in the first set of pre-determined control data is excluded from the first subset and the second subset.

10. A device, comprising:
    at least one input terminal to receive data comprising control data from a plurality of logical ports;
    a memory configured to store a first set of control data; and
    a detector, coupled to the at least one input terminal and to the memory, and configured to search for the control data, which are comprised in the data received at the at least one input terminal, in the memory, wherein a respective subset of the first set is assigned to a respective one of the logical ports and the detector ignores the respective subset when searching for the control data received from the respective logical port, wherein the respective subset is defined by a respective transparency indication comprising one or more bit combinations to be excluded.

11. The device of claim 10, wherein the memory is a ternary content-addressable memory.

12. The device of claim 10, wherein a respective one of the control data is assigned to a respective action that is to be performed when the respective control data is detected.

13. A method, comprising:
receiving data comprising control data from a plurality of logical ports; and
searching for the control data in a first set of pre-determined control data, wherein a respective subset of the first set is assigned to a respective one of the logical ports and the respective subset is excluded from the first set when searching for the control data received from the respective logical port, wherein the respective subset is defined by a respective transparency indication comprising one or more bit combinations to be excluded.

14. The method of claim 13, wherein the first set of the pre-determined control data is stored in a ternary content-addressable memory.

15. The method of claim 13, wherein the respective transparency indication is assigned to each of the pre-determined control data.

16. The method of claim 13, wherein the respective transparency information is assigned to each of the logical ports.

17. The method of claim 13, wherein, a respective transparency indication is assigned to each of the pre-determined control data and a respective transparency information is assigned to each of the logical ports, and wherein when searching for control data received from a respective one of the logical ports, a respective one of the pre-determined control data is omitted from the search for the control data if the transparency indication of the respective pre-determined control data matches the transparency information of the respective logical port.

18. The method of claim 13, wherein the data received from the logical ports are arranged in data packets and/or frames.

19. The method of claim 13, wherein the first set of pre-determined control data is associated with one or more communication protocols.

20. The method of claim 13, wherein a respective one of the control data is assigned to a respective action that is to be performed when the respective control data is detected.

21. The method of claim 13, wherein a first subset of the first set of pre-determined control data is assigned to a first one of the plurality of logical ports and a second subset of the first set of pre-determined control data is assigned to a second one of the plurality of logical ports, and wherein at least one element in the first set of pre-determined control data is excluded from the first subset and the second subset.

22. A device, comprising:
a plurality of logical ports; and
a detector, receiving data comprising control data from the plurality of logical ports, and configured to search for the control data in a first set of pre-determined control data, wherein a respective subset of the first set is assigned to a respective one of the logical ports and the respective subset is excluded from the first set when searching for the control data received from the respective logical port, wherein the respective subset is defined by a respective transparency indication comprising one or more bit combinations to be excluded.

23. The device of claim 22, wherein the first set of the pre-determined control data is stored in a content-addressable memory, in particular a ternary content-addressable memory.

24. The device of claim 22, wherein the respective transparency indication is assigned to each of the pre-determined control data.

25. The device of claim 24 wherein, when searching for control data received from a respective one of the logical ports, the detector is configured to omit a respective one of the pre-determined control data from the search for the control data when the transparency indication of the respective pre-determined control data matches the transparency information of the respective logical port.

26. The device of claim 22, wherein the respective transparency information is assigned to each of the logical ports.

27. The device of claim 22, wherein the data received from the logical ports are arranged in data packets and/or frames.

28. The device of claim 22, wherein the first set of pre-determined control data is associated with one or more communication protocols.

29. The device of claim 22, wherein a respective one of the control data is assigned to a respective action that is to be performed when the respective control data is detected.

* * * * *